US 8,942,114 B2

(12) United States Patent
Wang et al.

(10) Patent No.: US 8,942,114 B2
(45) Date of Patent: Jan. 27, 2015

(54) SYSTEM AND METHOD FOR CALCULATING UTILIZATION ENTROPY (75) Inventors: Xi Wang, Murphy, TX (US); Inwoong Kim, Allen, TX (US); Qiong Zhang, Plano, TX (US); Paparao Palacharla, Richardson, TX (US); Motoyoshi Sekiya, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 879 days.

(21) Appl. No.: 13/165,352

(22) Filed: Jun. 21, 2011

(65) Prior Publication Data
US 2012/0328286 A1 Dec. 27, 2012

(51) Int. Cl.
*H04L 12/26* (2006.01)
*H04L 12/28* (2006.01)

(52) U.S. Cl.
CPC .................... *H04L 43/0882* (2013.01)
USPC .......................................... 370/252; 370/400

(58) Field of Classification Search
None
See application file for complete search history.

(56) References Cited

U.S. PATENT DOCUMENTS

| | | | | |
|---|---|---|---|---|
| 6,512,612 | B1 * | 1/2003 | Fatehi et al. | 398/49 |
| 6,870,666 | B2 * | 3/2005 | Wada | 359/337 |
| 2005/0163059 | A1 * | 7/2005 | Dacosta et al. | 370/252 |
| 2006/0188252 | A1 * | 8/2006 | Schluter | 398/25 |
| 2010/0188986 | A1 * | 7/2010 | Csaszar et al. | 370/252 |

OTHER PUBLICATIONS

Sole-Pareta et al.; "Some open issues in the optical networks control plane"; Adv. Broadband Commun. Lab., 2003.
K. Loja et al.; "Inter-Domain Routing in Multi-Povider Optical Networks: Game Theory and Simulations"; EuroNGI, The first Conference on Traffic Engineering for the Next Generation Internet, 2005.
Perenyi et al.; "Grooming Node Placement in Multilayer Networks"; ONDM 2005; 9th Conference on Optical Network Design and Modeling, 2005.
Saad et al.; "Constraint-based routing across multi-domain optical WDM networks"; Canadian Conference on Electrical and Computer Engineering, 2004.
Saad et al.; "Inter-domain wavelength routing in optical WDM networks"; Telecommunications Network Strategy and Planning Syposium; Networks 2004, 11th International, 2004.
Dotaro et al.; "Multi-Region Networks: Generalized Multi-Protocol Label Switching (GMPLS) as Enabler for Vertical Integration"; Alcatel Technology White Paper, 2005.
T. Cinkler; "Traffic and λ Grooming"; IEEE Network; vol. 17, No. 2; pp. 16-21, 2003.
Modaino et al.; "Traffic Grooming in WDM Networks"; IEEE Communications Magazine; vol. 39, No. 7; pp. 124-129, 2001.

(Continued)

*Primary Examiner* — Hong Cho
(74) *Attorney, Agent, or Firm* — Baker Botts L.L.P.

(57) ABSTRACT

A system and method are provided for monitoring traffic in a network comprising a plurality of links, wherein each of the plurality of links comprises a plurality of neighboring pairs of slots. The system and method may include identifying a first usage status and a second usage status, calculating a utilization entropy value based at least on the difference between the first and second usage status, iteratively calculating a set of utilization entropy values for a portion of the network, and calculating an overall utilization entropy value for the portion of the network under analysis based at least on a statistical analysis of the set of utilization entropy values.

42 Claims, 5 Drawing Sheets

(56) References Cited

OTHER PUBLICATIONS

Banerjee et al.; "Generalized Multiprotocol Label Switching: An Overview of Signalling Enhancements and Recovery Techniques"; IEEE Communications Magazine; vol. 39, No. 7; pp. 144-151, 2001.

Rajagopalan et al.; "IP Over Optical Networks: Architectural Aspects"; IEEE Communications Magazine; vol. 38, No. 9; pp. 94-102, 2000.

Sabella et al.; "Traffic Engineering in Optical Networks"; IEEE Network, vol. 17, No. 2, 2003.

Wauters et al.; Design of the Optical Path Layer in Multiwavelength Cross-Connected Networks; IEEE Journal on Selected Areas in Communications, vol. 14, No. 5; pp. 881-892, 1996.

Zhang et al.; "A Heuristic Wavelength Assignment Algorithm for Multihop WDM Networks with Wavelength Routing and Wavelength Re-Use"; Transactions on IEEE Networking, vol. 3, No. 3; pp. 281-288, 1995.

Ramaswami et al.; "Routing and Wavelength Assignment in All-Optical Networks"; IEEE Transactions on Networking; vol. 3, No. 5; pp. 489-500, 1995.

Ramaswami et al.; "Design of Logical Topologies for Wavelength-Routed Optical Networks"; IEEE Journal on Selected Areas in Communications, vol. 14, No. 5; pp. 840-851, 1996.

Banerjee et al.; "A practical approach for routing and wavelength assignment in large wavelength-routed optical networks"; IEEE Journal on Selected Areas in Communications; vol. 14, No. 5; pp. 903-908, 1996.

Chlamtac et al.; "Lightpath (Wavelength) Routing in Large WDM Networks"; IEEE Journal on Selected Areas in Communications; vol. 14, No. 5; pp. 903-913, 1996.

Mukherjee et al.; "Some Principles for Designing a Wide-Area WDM Optical Network"; IEEE Transactions on Networking, vol. 4, No. 5; pp. 684-696, 1996.

Cinkler et al.; "Heuristic Algorithms for Joint Configuration of the Optical and Electrical Layer in Multi-Hop Wavelength Routing Networks"; IEEE INFOCOM 2000; pp. 1000-1009, 2000.

Zhu et al.; "Traffic Engineering in Multigranularity Heterogeneous Optical WDM Mesh Networks Through Dynamic Traffic Grooming"; IEEE Network, vol. 17, No. 2; pp. 8-15, 2003.

De Maesschalck et al.; "Intelligent Optical Networking for Multilayer Survivability"; IEEE Communications Magazine, vol. 40, No. 1; pp. 42-49, 2002.

Zhu et al.; "A Novel Generic Graph Model for Traffic Grooming in Heterogeneous WDM Mesh Networks"; IEEE/ACM ToN: Transactions on Networking; vol. 11, No. 2; pp. 285-299, 2003.

Ou et al.; "Traffic Grooming for Survivable. WDM Networks—Shared Protection"; IEEE JSAC: Journal on Selected Areas in Communications; vol. 21, No. 9; 1367-1382, 2003.

S. Johansson; "Transport Network Involving a Reconfigurable WDM Network Layer—a European Demonstration"; IEEE Journal on Lightwave Technology; vol. 14, No. 6; pp. 1341-1348, 1996.

Vigoureux et al.; "Multi-Layer Traffic Engineering for GMPLS-enabled Networks"; IEEE Communications Magazine; vol. x, No. x, 2004.

\* cited by examiner

SYSTEM AND METHOD FOR CALCULATING UTILIZATION ENTROPY

TECHNICAL FIELD

This invention relates generally to the field of optical communication networks and more specifically to calculating utilization entropy for an optical communication network.

BACKGROUND

A communication network includes paths of nodes that route packets through the network. Packets may route through the network on one of many different communication paths. These communication paths may be made up of a number of links between nodes, with each link divided into a number of channels or slots. As required connections are made and then broken, a link may become fragmented. For instance, a first communication demand may require four slots, and then a later demand for three slots, followed by a still later demand for one slot. As these types of communication demands increase over time, it may become increasingly difficult to identify an appropriately contiguous section of slots necessary to handle a given communication demand.

When an optical network becomes excessively fragmented some or all of the optical network may be optimized. However, there remain serious difficulties in determining when such optimization may be appropriate for some or all of the network. Particularly, difficulties remain in determining when some or all of the network has become sufficiently fragmented to warrant optimization.

SUMMARY OF THE DISCLOSURE

In accordance with the present invention, disadvantages and problems associated with previous techniques for dynamically allocating network resources may be reduced or eliminated.

According to one embodiment of the present invention, a system and method are provided for monitoring traffic in a network comprising a plurality of links, wherein each of the plurality of links comprises a plurality of neighboring pairs of slots. The system and method may include identifying a usage status for a first slot and a second slot, calculating a utilization entropy value for the first and second slots, the utilization entropy value based at least on a difference between the usage status for the first slot and the usage status for the second slot, performing the above steps for each of the neighboring pairs of the plurality of neighboring pairs of slots to create a set of utilization entropy values, and calculating a link utilization entropy value, the link utilization entropy value based at least on a statistical analysis of the set of utilization entropy values.

According to another embodiment of the present invention, a system and method are provided for monitoring traffic in a network comprising a plurality of neighboring pairs of links, wherein each of the links of the plurality of neighboring pairs of links comprises a plurality of slots. The system and method may include identifying a first usage status for a slot in a first link, identifying a second usage status for the slot in a second link, calculating a utilization entropy value for the slot in the first and second links, the utilization entropy value based at least on a difference between the first usage status and the second usage status, performing the above steps for each of the neighboring pairs of the plurality of neighboring pairs of links to create a set of utilization entropy values, and calculating a slot utilization entropy value, the slot entropy value based at least on a statistical analysis of the set of utilization entropy values.

One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
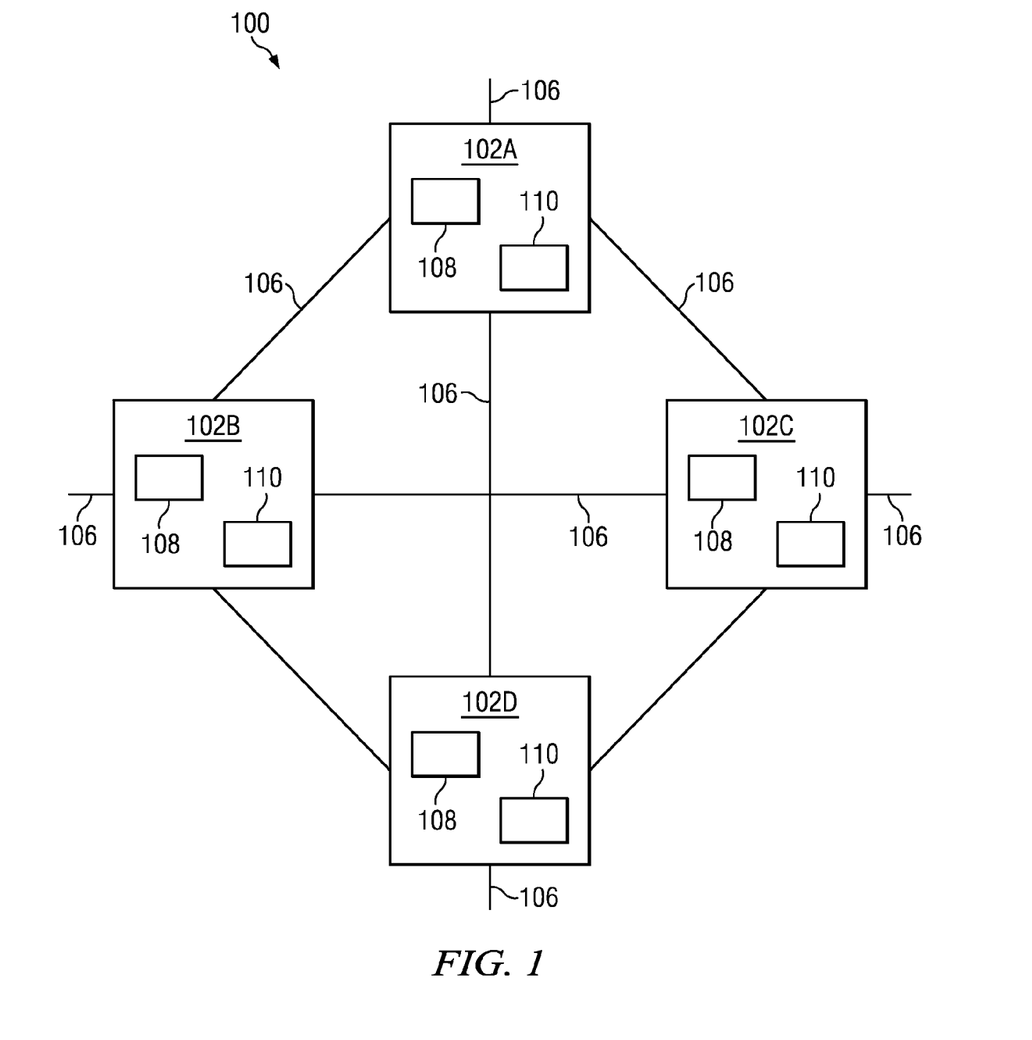
FIG. 1 illustrates a network system, in accordance with certain embodiments of the present disclosure.

FIG. 1 illustrates a network system 100, in accordance with certain embodiments of the present disclosure. Network system 100 may include components such as network nodes 102 interconnected by links 106. In general, a network node 102 may include any suitable arrangement of components operable to perform the operations of the network node. As an example, a network node may include logic, an interface, memory, other components, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a network node operable to receive input for the network node, send output from the network node, perform suitable processing of the input or output or both, or any combination of the preceding, and may comprise one or more ports, conversion software, or both.

"Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

In some embodiments, node 102 may also include traffic monitoring module 108. Traffic monitoring module 108 may be configured to monitor network traffic of the optical circuits connected to node 102, as described in more detail below with reference to FIGS. 2-5. In some embodiments, traffic monitoring module 108 may be an integrated part of a switch card, or may be implemented in some other appropriate hardware and/or software running on hardware within node 102.

In some embodiments, node 102 may also include one or more optical transmitters. Optical transmitters 110 may be configured to transmit provisioned wavelengths to other nodes 102 of network system 100.

In some embodiments, network system 100 may also include a network management system configured to perform various tasks on a network wide basis. For example, a network management system may be configured to compile data from multiple traffic management modules 108 from multiple nodes 102. The network management system may also be configured to perform certain calculations on that accumulated data. For example, as described in more detail above with reference to FIGS. 4-5, a network management system may be configured to perform statistical analyses on sets of utilization entropy values.

In some embodiments, network system 100 may also include a network optimization engine. The network optimization engine may be configured to perform optimization functions on some or all of network system 100 in response to certain inputs. For example, the network optimization engine may be configured to perform optimization functions on some or all of network system 100 in response to a determination that some or all of network system 100 is overly fragmented.

Network system 100 communicates information through signals, such as an optical signal, over communication paths across network system 100. A communication path may be made up of one or more links 106 between nodes 102 of network system 100. In some embodiments, links 106 may be divided into multiple wavelength channels or slots ("slots"). The number and bandwidth of each slot may depend on a variety of factors, including the frequency of the transmitted signal.

For instance, an optical signal may have a frequency of approximately 1550 nanometers and a data rate of 10, 20, 40, or over 40 gigabits per second. As an illustrative example, the carrier wavelengths of network system 100 may transmit data at 10 Gigabits per second, in accordance with the 10 Gigabit Ethernet standard.

The process of communicating information over multiple slots of a single optical path is referred to in optics as wavelength division multiplexing (WDM). Dense wavelength division multiplexing (DWDM) refers to the multiplexing of a larger (denser) number of wavelengths, usually greater than forty, onto a link 106. WDM, DWDM, or other multi-wavelength transmission techniques are employed in optical networks to increase the aggregate bandwidth per optical fiber. Without WDM or DWDM, the bandwidth in networks would be limited to the bit rate of solely one wavelength. With more bandwidth, optical networks are capable of transmitting greater amounts of information. Referring again to FIG. 1, network system 100 may be operable to transmit disparate slots using WDM, DWDM, or some other suitable multi-slot multiplexing technique, and to amplify the multiplexed wavelengths.

According to the illustrated embodiment, network system 100 may include nodes 102 coupled by links 106 in a mesh topology as shown in FIG. 1 or any other suitable topology, such as a liner or ring topology. In the illustrated embodiment, network system 100 includes four nodes 102, referenced as 102A, 102B, 102C, and 102D. These references are intended for use solely for ease of description. Although four nodes are illustrated, the network may contain more or fewer nodes, depending on the implementation desired.

Network system 100 may be used in any optical communication network, or any other suitable network or combination of networks. Links 106 may comprise any suitable type of network link, such as a Single-Mode Fiber (SMF), Enhanced Large Effective Area Fiber (E-LEAF), or TrueWave® Reduced Slope (TW-RS) fiber.

In some embodiments, network system 100 may be designed to transmit each signal on a particular carrier wavelength within a given slot. The number of slots may vary depending on the chosen implementation. As an illustrative example, network system 100 may include 352 slots, with a slot separation of 12.5 GHz (~0.1 nm). In some embodiments, network system 100 may include some means of dynamically allocating incoming signals to various slots, depending on the design needs, such that none, some, or all slots are in use at one time.

In operation, network system 100 may receive a number of demands for routing optical traffic. In some embodiments, optical traffic demands may include a diverse range of requests for data transmission, including fixed-bandwidth connections, bandwidth adjustable connections with or without a transmission deadline, connections with a default minimum or maximum bandwidth requirements, and/or connections with a maximum permissible delay. Such optical traffic demands may require provisioning of one or more slots to accommodate the requested data. For example, an optical traffic demand arriving at time $t_1$ may require the use of four slots in link 106 between nodes 102A and 102B. At a later time, $t_2$, an optical traffic demand may arrive that requires the use of only three slots in link 106 between nodes 102A and 102B. Network system 100 may provision three of the slots used previously for the $t_1$ demand for the $t_2$ demand, leaving one of the slots unused. At a later time, $t_3$, a third optical traffic demand may arrive that requires the use of only one slot in link 106 between nodes 102A and 102B. Network system 100 may provision one of the slots used previously for either the $t_1$ or $t_2$ demands. Over time, link 106 may become fragmented as a result of the optical traffic demands, making it increasingly difficult for network system 100 to provision multiple contiguous slots for an optical traffic demand.

In an effort to measure the degree of fragmentation in network system 100, network system 100 may calculate one or more utilization entropy values for various parts of network system 100. A utilization entropy value may be any value that measures the amount of fragmentation or disorder within the various parts of network system 100.

As described in more detail below with reference to FIGS. 2-5, network system 100 may measure the amount of fragmentation by measuring various utilization entropy values in network system 100. In some embodiments, a utilization entropy value may correspond to a difference between the usage status of two portions of network system 100. As optical traffic demands come and go, network system 100 may measure differences in usage status, either between multiple slots within a link or for one slot between multiple links, in order to determine the level of fragmentation. If the level of fragmentation is sufficiently high, network system 100 may communicate a signal indicating that some or all of network system 100 may need optimization.

In some embodiments, traffic monitoring module 108 may be responsible for measuring the utilization entropy values in network system 100, as described in more detail below with reference to FIGS. 2-5.

Figure 2:
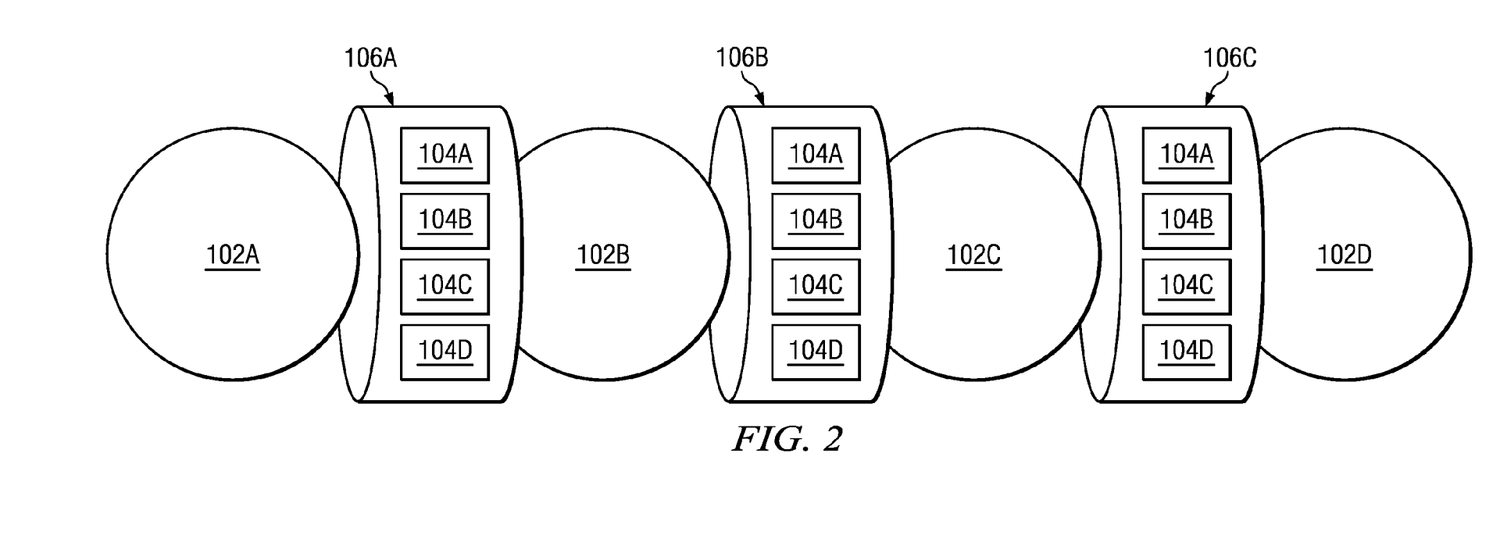
FIG. 2 illustrates a portion of a network system comprising four nodes, in accordance with certain embodiments of the present disclosure.

FIG. 2 illustrates a portion of network system 100 comprising four nodes 102A, 102B, 102C, and 102D, in accordance with certain embodiments of the present disclosure. As described in more detail above with reference to FIG. 1, network system 100 may include components such as network nodes 102 interconnected by links 106. Network system 100 may include any number of nodes 102 configured in any appropriate topology. For ease of illustration, FIG. 2 depicts four such nodes, labeled nodes 102A, 102B, 102C, and 102D. These four nodes 102A, 102B, 102C, 102D may be connected via links 106A, 106B, 106C. These labels are provided for ease of discussion only and are not intended to limit the scope of the present disclosure.

As an illustrative example, FIG. 2 illustrates a single link 106 between each pair of nodes 102. Further, each link 106 may comprise a number of slots 104, with each slot 104 assigned to a different carrier wavelength. As described in more detail above with reference to FIG. 1, link 106 may comprise any number of slots 106, for example 352 slots 104 in a WDM configuration with 12.5 GHz spacing between slots 104. Although any number of slots 104 may be present in link 106, for ease of discussion FIG. 2 illustrates four slots 104, labeled for ease of discussion as slots 104A, 104B, 104C, and 104D for each link 106.

In operation, traffic monitoring module 108 of nodes 102 may monitor a usage status for each slot 104 of link 106 connected to node 102. In some embodiments, a usage status for slot 104 may be a binary indicator of whether slot 104 is currently in use. For example, a value of 1 may indicate that slot 104 is in use, while a value of 0 may indicate that slot 104 is not in use.

After determining the usage status for slots 104, traffic monitoring module 108 of nodes 102 may then determine a link utilization entropy value for the set of slots 104 under analysis. In some embodiments, this may include determining the number of usage status differences from one slot 104 to another slot 104. In other embodiments, this may include determining the number of usage status differences from one slot 104 across multiple links 106 of network system 100. In calculating usage status differences in different ways, different embodiments may provide utilization entropy information for different types of potential optimizations. For example, usage status differences across slots 104 within link 106 may be useful in determining the overall utilization entropy level of link 106. As another example, usage status differences for one slot 104 across multiple links 106 may be useful in determining the overall utilization entropy level of a communication path containing multiple links 106.

TABLES 1-10 below, and the corresponding descriptive examples, are provided to aid in understanding the operation of network system 100 in some embodiments. However, these example are provided as illustration only, and are not meant to limit the scope of the present disclosure.

In some embodiments, it may be necessary or desirable to determine the link utilization entropy for a link 106 of network system 100. As described in more detail above with reference to FIG. 1, link 106 may comprise a number of slots 104. As depicted in the illustrative example of FIG. 2, link 106A between nodes 102A and 102B may include four slots 104A, 104B, 104C, 104D. TABLE 1 below provides an illustrative example of usage status values gathered by traffic monitoring module 108 of either node 102A or node 102B for each slot 104A, 104B, 104C, 104D at time $t_1$.

TABLE 1

| Slot | Slot ID | Usage Status |
| --- | --- | --- |
| 104A | 0 | 0 |
| 104B | 1 | 0 |
| 104C | 2 | 0 |
| 104D | 3 | 0 |

As described in the example data of TABLE 1, each of the four illustrative slots 104A, 104B, 104C, 104D has a corresponding slot ID. This slot ID may be an internal reference number used by owner and/or operator of network system 100 to reference a particular slot 104. Additionally, the illustrative data indicates that the usage status for each slot 104 is 0. That is, in the example, none of the slots 104 are currently carrying network traffic.

In some embodiments, measuring the fragmentation of a link at a given time may include calculating a set of utilization entropy values. A utilization entropy value may be a difference between a first usage status and a second usage status ("a usage status difference"). In this example, a utilization entropy value may be a usage status difference between one slot 104 and another slot 104 within link 106. The set of utilization entropy values may be the total number of differences in usage status between one slot 104 and another within link 106. In the above example, this would involve counting the number of differences in usage status between slot 104A and slot 104B, between slot 104B and slot 104C, and between slot 104C and slot 104D. Generally, the total number of possible usage status differences will be the number of slots 104 minus one. In the above example, there are zero usage status differences, as all slots 104 are currently unoccupied, and thus all the usage status values are the same.

After calculating the number of usage status differences, this number can be normalized by dividing the number of usage status differences by the total number of possible usage status differences. In the above example, the normalized value would be zero (the number of usage status differences) divided by three (the total number of possible usage status differences). This would give a normalized link utilization entropy value for link 106 comprising slots 104A, 104B, 104C, 104D of zero.

After some time, link 106A may begin to carry different network traffic. It may be necessary or desirable to determine the link utilization entropy for link 106A at a later time. TABLE 2 below provides an illustrative example of usage status values gathered by traffic monitoring module 108 of either node 102A or node 102B for each slot 104A, 104B, 104C, 104D at time $t_2$.

TABLE 2

| Slot | Slot ID | Usage Status |
| --- | --- | --- |
| 104A | 0 | 1 |
| 104B | 1 | 0 |
| 104C | 2 | 0 |
| 104D | 3 | 0 |

As described in the example data of TABLE 2, each of the four illustrative slots 104A, 104B, 104C, 104D has a corresponding usage status. In the above example, only slot 104A is carrying network traffic and therefore has a usage status of 1. Because the remaining slots 104B, 104C, 104D are not carrying traffic, the usage status for these is 0.

After calculating the number of usage status differences, this number can be normalized by dividing the number of usage status differences by the total number of possible usage status differences. In the above example, the normalized value would be one (the number of usage status differences) divided by three (the total number of possible usage status differences). This would give a normalized link utilization entropy value for link 106A comprising slots 104A, 104B, 104C, 104D of approximately 0.33.

TABLE 3 below provides an illustrative example of usage status values gathered by traffic monitoring module 108 of either node 102A or node 102B for each slot 104A, 104B, 104C, 104D at time $t_3$.

TABLE 3

| Slot | Slot ID | Usage Status |
|---|---|---|
| 104A | 0 | 1 |
| 104B | 1 | 1 |
| 104C | 2 | 0 |
| 104D | 3 | 0 |

In the above example, slots 104A, 104B are carrying network traffic and therefore have a usage status of 1. Because the remaining slots 104C, 104D are not carrying traffic, the usage status for each is 0.

After calculating the number of usage status differences, this number can be normalized by dividing the number of usage status differences by the total number of possible usage status differences. In the above example, the normalized value would be one (the number of usage status differences) divided by three (the total number of possible usage status differences). This would give a normalized link utilization entropy value for link 106A comprising slots 104A, 104B, 104C, 104D of approximately 0.33.

TABLE 4 below provides an illustrative example of usage status values gathered by traffic monitoring module 108 of either node 102A or node 102B for each slot 104A, 104B, 104C, 104D at time $t_4$.

TABLE 4

| Slot | Slot ID | Usage Status |
|---|---|---|
| 104A | 0 | 1 |
| 104B | 1 | 0 |
| 104C | 2 | 1 |
| 104D | 3 | 0 |

In the above example, slots 104A, 104C are carrying network traffic and therefore have a usage status of 1. Because the remaining slots 104B, 104D are not carrying traffic, the usage status for each is 0.

After calculating the number of usage status differences, this number can be normalized by dividing the number of usage status differences by the total number of possible usage status differences. In the above example, the normalized value would be three (the number of usage status differences) divided by three (the total number of possible usage status differences). This would give a normalized link utilization entropy value for link 106A comprising slots 104A, 104B, 104C, 104D of one.

TABLE 5 below provides an illustrative example of usage status values gathered by traffic monitoring module 108 of either node 102A or node 102B for each slot 104A, 104B, 104C, 104D at time $t_5$.

TABLE 5

| Slot | Slot ID | Usage Status |
|---|---|---|
| 104A | 0 | 1 |
| 104B | 1 | 1 |
| 104C | 2 | 0 |
| 104D | 3 | 1 |

In the above example, slots 104A, 104B, 104D are carrying network traffic and therefore have a usage status of 1. Because the remaining slot 104C is not carrying traffic, the usage status for it is 0.

After calculating the number of usage status differences, this number can be normalized by dividing the number of usage status differences by the total number of possible usage status differences. In the above example, the normalized value would be two (the number of usage status differences) divided by three (the total number of possible usage status differences). This would give a normalized link utilization entropy value for link 106A comprising slots 104A, 104B, 104C, 104D of approximately 0.67.

TABLE 6 below provides an illustrative example of usage status values gathered by traffic monitoring module 108 of either node 102A or node 102 for each slot 104A, 104B, 104C, 104D at time $t_6$.

TABLE 6

| Slot | Slot ID | Usage Status |
|---|---|---|
| 104A | 0 | 1 |
| 104B | 1 | 1 |
| 104C | 2 | 1 |
| 104D | 3 | 1 |

In the above example, slots 104A, 104B, 104C, and 104D are carrying network traffic and therefore have a usage status of 1.

After calculating the number of usage status differences, this number can be normalized by dividing the number of usage status differences by the total number of possible usage status differences. In the above example, the normalized value would be zero (the number of usage status differences) divided by three (the total number of possible usage status differences). This would give a normalized link utilization entropy value for link 106A comprising slots 104A, 104B, 104C, 104D of zero.

As described above with reference to the illustrative examples of TABLES 1-6 and corresponding descriptions, in some embodiments, traffic monitoring module 108 may determine utilization entropy values for slots 104 within link 106. After determining these utilization entropy values, traffic monitoring module 108 may be configured to calculate a link utilization entropy value based at least on a statistical analysis of the set of utilization entropy values. The link utilization entropy value changes may further be normalized in some embodiments. For example, the data from TABLE 1 may give a normalized link utilization entropy value ("LUE") of 0, TABLE 2 an LUE of approximately 0.33, TABLE 3 an LUE of approximately 0.33, TABLE 4 an LUE of 1, TABLE 5 an LUE of approximately 0.67, and TABLE 6 an LUE of 0.

These values are provided as illustrative examples only to aid in understanding the present disclosure. In some configurations, the number of slots 104 within link 106 may vary greatly. As described in more detail above with reference to FIG. 1, for example, link 106 may include 352 slots 104. Additionally, other statistical analyses of utilization entropy values may be used to produce an LUE without departing from the scope of the present disclosure. For example, slots 104 of link 106 may be subdivided for analysis, with a utilization entropy value calculated for each subset of slots 104 of link 106. As described in more detail below with reference to TABLES 7-10 and FIGS. 3-5, such an analysis may be appropriate in certain configurations for determining a utilization entropy value for a communication path. In these and other embodiments, the utilization entropy values calculated for each subset of slots 104 of link 106 may then be analyzed in the aggregate to develop a LUE for link 106. For example, an average may be taken, or another appropriate statistical analysis applied.

In certain embodiments, it may be necessary or desirable to determine a utilization entropy value for an entire network system 100 or communication path within network system 100. In some embodiments, this may include performing a statistical analysis on a set of utilization entropy values for one slot 104 across multiple links 106 of network system 100.

TABLES 7-10 below, and the corresponding descriptive examples, are provided to aid in understanding the operation of network system 100 in some embodiments. However, these example are provided as illustration only, and are not meant to limit the scope of the present disclosure.

In some embodiments, it may be necessary or desirable to determine the utilization entropy for network system 100. As described in more detail above with reference to FIG. 1, network system 100 may include a number of links 106, wherein each link may include a number of slots 104. As depicted in the illustrative example of FIG. 2, link 106A between nodes 102A, 102B may include four slots 104A, 104B, 104C, 104D. Similarly link 106B between nodes 102B, 102C may include four slots 104A, 104B, 104C, 104D; and link 106C between nodes 102C, 102D may include four slots 104A, 104B, 104C, 104D.

TABLE 7 below provides an illustrative example of usage status values gathered by traffic monitoring module 108 of either node 102A, 102B, 102C, or 102D for slot 104A at each link 106A, 106B, 106C. Once the utilization entropy values are gathered, in some embodiments they may then be sent to a network management system of network system 100 to compile the data and perform certain calculations.

TABLE 7

| Link | Link ID | Slot 104A Usage Status |
|---|---|---|
| Link 106A | 0 | 0 |
| Link 106B | 1 | 0 |
| Link 106C | 2 | 0 |

As described in the example data of TABLE 7, each of the three illustrative links 106 has a corresponding link ID. This link ID may be an internal reference number used by owner and/or operator of network system 100 to reference a particular link 106. Additionally, the illustrative data indicates that the usage status for slot 104A at each link is 0. That is, in the example, slot 104A is not carrying any network traffic at any link 106.

In some embodiments, measuring fragmentation at a given time may include calculating a set of utilization entropy values. In this example, a utilization entropy value may be a usage status difference for a slot 104 from one link 106 to another link 106 ("usage status difference"). The set of utilization entropy values may be the total number of differences between a usage status for a slot 104 at one link 106 and a usage status for the same slot 104 at another link 106. In the above example, for slot 104A, this would involve counting the number of times the usage status for slot 104A is different from link 106A to link 106B and from link 106B to link 106C. Generally, the total number of possible usage status differences will be the number of links 106 minus one. In the above example, there are zero usage status differences, as slot 104A at all links 106 is currently unoccupied.

After calculating the number of usage status differences, this number can be normalized by dividing the number of usage status differences by the total number of possible usage status differences. In the above example, the normalized value would be zero (the number of usage status differences) divided by two (the total number of possible usage status differences). This would give a normalized slot utilization entropy value for slot 104A of zero.

In some embodiments, the analysis applied to the example data of TABLE 7 could be repeated for each slot 104 of network system 100 and a statistical analysis applied to the subsequent set of utilization entropy values. For example, in the illustrated embodiment of FIG. 2, there are four slots 104. A statistical analysis may include taking the average of all slot utilization entropy ("SUE") values for all slots 104 in all links 106 of network system 100. By combining the example data of TABLE 7 with the example data of TABLES 8-10 below, a value can be determined for a normalized network utilization entropy ("NUE") value for network system 100.

As well as analyzing slot 104A, it may be necessary or desirable to analyze slot 104B to determine a network utilization entropy value for network system 100. TABLE 8 below provides an illustrative example of utilization entropy values in the form of usage status values gathered by traffic monitoring module 108 of node 102A, 102B, 102C for slot 104B at each link 106A, 106B, 106C. Once the utilization entropy values are gathered, in some embodiments they may then be sent to a network management system of network system 100 to compile the data and perform certain calculations.

TABLE 8

| Link | Link ID | Slot 104B Usage Status |
|---|---|---|
| 106A | 0 | 1 |
| 106B | 1 | 0 |
| 106C | 2 | 0 |

As described in the example data of TABLE 8, slot 104B is only carrying traffic on link 106A, that is, between nodes 102A and 102B. Slot 104B is not carrying traffic on any other link 106B, 106C.

After calculating the number of usage status differences, this number can be normalized by dividing the number of usage status differences by the total number of possible usage status differences. In the above example, the normalized value would be one (the number of usage status differences) divided by two (the total number of possible usage status differences). This would give a normalized slot utilization entropy value for slot 104B of 0.5.

As well as analyzing slots 104A, 104B, it may be necessary or desirable to analyze slot 104C to determine a network utilization entropy value for network system 100. TABLE 9 below provides an illustrative example of usage status values gathered by traffic monitoring module 108 of node 102A, 102B, 102C for slot 104C at each link 106A, 106B, 106C. Once the utilization entropy values are gathered, in some embodiments they may then be sent to a network management system of network system 100 to compile the data and perform certain calculations.

TABLE 9

| Link | Link ID | Slot 104C Usage Status |
| --- | --- | --- |
| 106A | 0 | 1 |
| 106B | 1 | 0 |
| 106C | 2 | 1 |

As described in the example data of TABLE 9, slot 104C is carrying traffic on links 106A, 106C, that is, between nodes 102A and 102B, and between nodes 102B and 102C. Slot 104C is not carrying traffic on link 106B.

After calculating the number of usage status differences, this number can be normalized by dividing the number of usage status differences by the total number of possible usage status differences. In the above example, the normalized value would be two (the number of usage status differences) divided by two (the total number of possible usage status differences). This would give a normalized slot utilization entropy value for slot 104C of 1.

As well as analyzing slots 104A, 104B, 104C it may be necessary or desirable to analyze slot 104D to determine a network utilization entropy value for network system 100. TABLE 10 below provides an illustrative example of usage status values gathered by traffic monitoring module 108 of node 102A, 102B, 102C for slot 104D at each link 106A, 106B, 106C. Once the utilization entropy values are gathered, in some embodiments they may then be sent to a network management system of network system 100 to compile the data and perform certain calculations.

TABLE 10

| Link | Link ID | Slot 104D Usage Status |
| --- | --- | --- |
| 106A | 0 | 1 |
| 106B | 1 | 1 |
| 106C | 2 | 1 |

As described in the example data of TABLE 10 slot 104D is carrying traffic on all links 106A, 106B, 106C, that is, between nodes 102A and 102B, between nodes 102B and 102C, and between nodes 102B and 102C.

After calculating the number of usage status differences, this number can be normalized by dividing the number of usage status differences by the total number of possible usage status differences. In the above example, the normalized value would be zero (the number of usage status differences) divided by two (the total number of possible usage status differences). This would give a normalized slot utilization entropy value for slot 104D of 0.

By combining the example data of TABLES 7-10, a value can be determined for a network utilization entropy value for network system 100. For example, a statistical analysis may be made of the slot utilization entropy ("SUE") values for all slots 104 of all links 106 of network system 100. One such statistical analysis may be to average all SUE values. In the example data of TABLES 7-10, this would include taking the average of 0 (SUE for slot 104A), 0.5 (SUE for slot 104B), 1 (SUE for slot 104C), and 0.0 (SUE for slot 104D). This would give a normalized network utilization entropy ("NUE") value of approximately 0.375.

Although the example data of TABLES 7-10 provide data for four slots 104 and three links 106 of network system 100, as described in more detail above with reference to FIG. 2, the number of slots 104 and/or links 106 of network system 100 may be much larger. Additionally, other statistical analyses of utilization entropy values may be used to produce an NUE without departing from the scope of the present disclosure. For example, a slot 104 may be analyzed only over a certain subset of links, with a utilization entropy value calculated for each subset of links 106. As described in more detail below, such an analysis may be appropriate in certain configurations for determining a network utilization entropy value based on the length of certain communication paths. In these and other embodiments, the utilization entropy values calculated for each subset of slots 104 of link 106 may then be analyzed in the aggregate to develop an NUE for network system 100. For example, an average may be taken, or another appropriate statistical analysis applied.

In some embodiments, it may be necessary or desirable to determine the utilization entropy for a particular communication path through network system 100. As described in more detail above with reference to FIG. 1, a communication path may be generally described as a set number of slots 104 over a set number of links 106 within network system 100. A communication path may be a collection of links 106 sufficient to get from one node 102 to another node 102 of network system 100. As an illustrative example, a communication path may be the set of links 106 required to communicate network traffic from node 102A to node 102B. In the example illustration of FIG. 2, link 106A may comprise a communication path from node 102A to node 102B. Likewise, the set of links 106A, 106B may comprise a communication path from node 102A to node 102C.

Calculating a path utilization entropy value for a communication path may be helpful in determining whether to optimize some or all of network system 100 when an optical traffic demand is received indicating a desired communication path. For example, in a data center environment, it may be known in advance that a backup process is scheduled for a certain time. In advance of this time, network system 100 may determine whether the communication path from the electronic devices requiring backup to the backup devices requires optimization by calculating a path utilization entropy value for the preferred path. In other examples, it may be helpful to determine if the shortest communication path is overly fragmented such that an alternative communication path should be used or that the shortest path should be optimized.

As described in more detail below with reference to FIGS. 4-5, a path utilization entropy ("PUE") value may be determined in a manner similar to that used to determine an NUE described above. However, rather than performing a statistical analysis on the set of slot utilization values for all slots 104 in all links 106 of network system 100, a statistical analysis may be performed on the set of slot utilization values for the slots 104 necessary to create a communication path.

An illustrative example may be demonstrated using the example data of TABLES 7-10. In this example, a communication path may be defined as two slots 104A, 104B from node 102A to node 102D. In the example, there is only one path from node 102A to node 102D, the path comprising links 106A, 106B, and 106C. As described above with reference to TABLES 7-10, the normalized slot utilization entropy value for slot 104A may be 0 using the example data. Similarly, the normalized slot utilization entropy value for slot 104B may be 0.5 using the example data. Applying the example statistical analysis described above, i.e., taking the average of the normalized slot utilization entropy values under consideration, the normalized path utilization entropy value may be calculated to be 0.25.

An additional illustrative example may be demonstrated using the example data of TABLES 7-10. In this example, a communication path may be defined as three slots 104A, 104B, 104C from node 102A to node 102C. In the example, there is only one path from node 102A to node 102C, the path comprising links 106A and 106B. As described above with reference to TABLES 7-10, the slot utilization value for slot 104A from node 102A to node 102C may be 0 using the example data. Similarly, the normalized slot utilization entropy value for slot 104B from node 102A to node 102C may be 1 using the example data. Applying the example statistical analysis described above, i.e., taking the average of the normalized slot utilization entropy values under consideration, the normalized path utilization entropy value may be calculated to be 0.5.

In some embodiments, a path utilization entropy value may be determined by analyzing a specific set of slots 104 across a set of links 106 of network system 100. In other embodiments, a path utilization entropy value may be determined by analyzing a number of sets of slots 104 across the set of links 106, wherein the sets of slots 104 are of an appropriate size. For example, it may be necessary or desirable to know a path utilization entropy value for a two-slot path from node 102A to node 102D. Depending on the configuration of network system 100, it may be possible to fulfill a network traffic demand for such a communication path in a variety of ways. Using the illustrative example of FIG. 2, the set of two-slot paths from node 102A to node 102D may include slots 104A, 104B; slots 104B, 104C; and/or slots 104C, 104D from node 102A to node 102D. In such a configuration it may be more helpful to apply a statistical analysis to the set of potential path utilization entropy values to determine an overall path utilization entropy value. That is, it may helpful to know the likelihood of a particular type of path being overly fragmented rather than the likelihood that a particular path is overly fragmented. One such statistical analysis may be to take the average of each of the potential path utilization entropy values to determine an overall path utilization entropy value. In still other embodiments, a path utilization entropy value may be adapted to calculate a network utilization entropy value in more advanced ways. For example, it may be useful to determine a path utilization entropy value for every potential path across network system 100. A network utilization entropy value may then be established by applying a statistical analysis to this set of path utilization entropy values. In some embodiments, this analysis may take into account the varying lengths of the potential paths. For example, referring to FIG. 1, there may be multiple paths from node 102A to node 102C. Such paths may be: first, from node 102A to node 102B to node 102C; second, from node 102A to node 102C; and third, from node 102A to node 102D to node 102C, and fourth, from node 102A to node 102B to node 102D to node 102C. By weighting the path utilization entropy values for each of these paths according to their respective lengths, a more descriptive value of the network utilization entropy may be achieved.

The various methods of calculating a utilization entropy value for the slots 104 links 106, network system 100, and communication paths are described in more detail below with reference to FIGS. 3-5.

Figure 3:
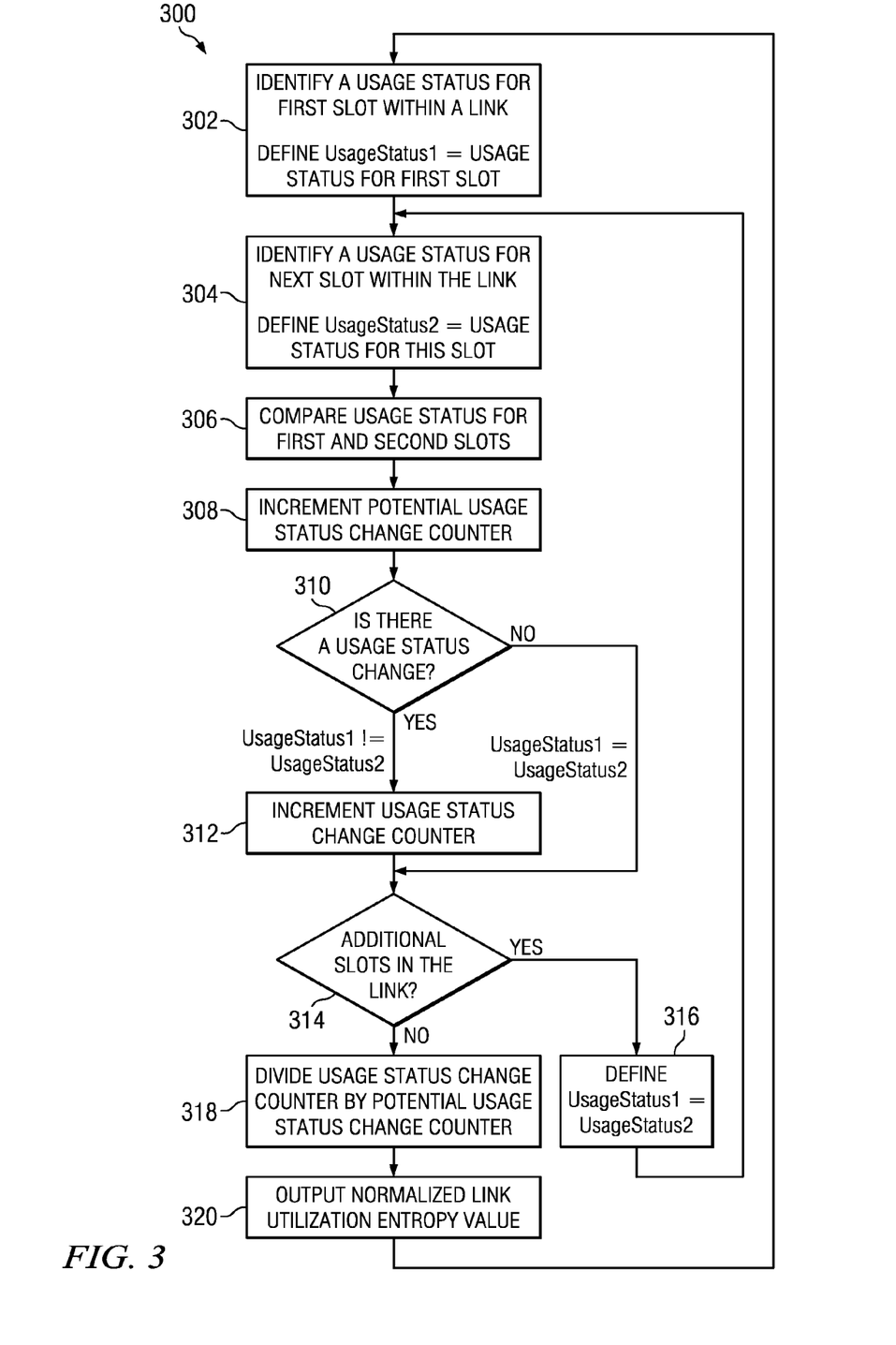
FIG. 3 is a flowchart illustrating one embodiment of a method of monitoring traffic in a network system to determine a normalized link utilization entropy value, in accordance with certain embodiments of the present disclosure.

FIG. 3 is a flowchart illustrating one embodiment of a method 300 of monitoring traffic in a network system 100 to determine a normalized link utilization entropy value, in accordance with certain embodiments of the present disclosure. Method 300 may include identifying a usage status for a plurality of slots, calculating a set of utilization entropy values, and calculating a normalized link utilization entropy value based on the set of utilization entropy values.

According to one embodiment, method 300 preferably beings at step 302. Teachings of the present disclosure may be implemented in a variety of configurations of nodes 102 and network system 100. As such, the preferred initialization point for method 300 and the order of steps 302-320 comprising method 300 may depend on the implementation chosen.

At step 302, network system 100 may identify a usage status for a first slot 104 within a link 106, as described in more detail above with reference to FIGS. 1-2. In some embodiments, the first slot 104 under analysis may be identified as the slot with the lowest value slot ID, as illustrated in the example data described above with reference to FIG. 2 and TABLES 1-6, or by some other appropriate procedure. In some embodiments, the usage status may be a binary indicator that slot 104 is currently carrying network traffic. For example, a value of "1" may indicate that slot 104 is carrying traffic, while a value of "0" may indicate that slot 104 is unoccupied.

For ease of illustration, portions of pseudo-code that may be used to implement the illustrated embodiment of FIG. 3 are depicted as part of step 302. This code indicates that a variable "UsageStatus1" may be set to be the usage status of the slot under analysis in step 302. This code is provided only to aid in understanding and should be read to limit the scope of the present disclosure. The use of UsageStatus1 and other pseudo code variables is described in further detail below. After identifying the first usage status, method 300 may proceed to step 304.

At step 304, network system 100 may identify a usage status for the next slot 104 of link 106 under analysis. In some embodiments, the slot 104 analyzed at step 302 and the slot 104 analyzed at step 304 may be a neighboring pair of slots, as described in more detail above with reference to FIGS. 1-2. For ease of illustration, the pseudo code variable "UsageStatus2" is shown as being set to the usage status of the slot under analysis at step 304. After identifying the usage status of the next slot 104 of link 106, method 300 may proceed to step 306.

At step 306, network system 100 may determine the difference between the usage statuses for the first and second slots 104 under analysis. That is, network system 100 may compare the values stored in UsageStatus1 and UsageStatus2. In some embodiments, this difference between the usage statuses of the two slots 104 may comprise a utilization entropy value for the set of two slots 104. after comparing the values, method 300 may proceed to step 308.

At step 308, method 300 may increment a potential usage status difference counter. Such a counter may be used to keep track of the number of total potential usage status differences for later normalization of entropy values. After incrementing this counter, method 300 may proceed to step 310.

At step 310, method 300 may determine whether there is a usage status difference between the two slots 104 under analysis, as described in more detail above with reference to FIGS. 1-2. If there is a difference between the two usage statuses, that is, if UsageStatus1 does not equal UsageStatus2, then method 300 may proceed to step 312.

At step 312, method 300 may calculate a utilization entropy value for the two slots 104 under analysis. In some embodiments, this utilization entropy value may be a change in usage status from the first slot 104 under analysis to the second slot 104 under analysis. Due to the iterative nature of method 300, at step 312 there may have accumulated a set of utilization entropy values. In order to calculate a single link utilization entropy value, method 300 may perform a statistical analysis on the set of utilization entropy values.

In some embodiments, this statistical analysis may be a summation of the total number of utilization entropy values. In these and other embodiments, it may be sufficient or desirable to increment a usage status difference counter. Such a counter may be used to keep track of the set of utilization entropy values (e.g., the number of actual usage status differences), thereby performing a statistical analysis on the set of utilization entropy values (e.g., summing the total number of actual usage status differences). After incrementing this counter, method 300 may proceed to step 314.

Referring again to step 310, if there was no usage status difference, that is, if UsageStatus1 equals UsageStatus2, then method 300 may proceed to step 314.

At step 314, network system 100 may determine whether there are additional slots 104 in link 106 that require analysis. As described in more detail above with reference to FIGS. 1-2, a link utilization entropy value may be based on a statistical analysis of a set of utilization entropy values for some or all of the slots 104 comprising link 106. If additional slots 104 are to be analyzed, method 300 may proceed to step 316.

At step 316, network system 100 may reset the pseudo code variable UsageStatus1. These variables are included only for ease of illustration, and are intended to facilitate understanding of the iterative nature of the illustrated embodiment of FIG. 3. In the example code, the value of UsageStatus2 is stored as UsageStatus1. After changing these values, method 300 may return to step 304 to continue analyzing slots 104 of link 106.

Referring again to step 314, if no additional slots 104 require analysis, method 300 may proceed to step 318. At step 318, the link utilization entropy value is normalized. In the illustrative example, the link utilization entropy value (e.g., the value of the usage status counter) is divided by a normalizing factor (e.g., the value of the potential usage status difference counter) to create a value between 0 and 1. After normalizing the link utilization entropy value, method 300 may proceed to step 320.

At step 320, method 300 may output the normalized link utilization entropy value to an appropriate portion of network system 100. This output may then be used to determine whether link 106 including the analyzed slots 104 needs to be optimized.

Although FIG. 3 discloses a particular number of steps to be taken with respect to method 300, method 300 may be executed with more or fewer steps than those depicted in FIG. 3. In addition, although FIG. 3 discloses a certain order of steps comprising method 300, the steps comprising method 300 may be completed in any suitable order. For example, method 300 is illustrated with step 308, and the corresponding increment of a potential usage status difference counter. In some configurations, the total number of potential usage status differences may be known in advance, and thus such a step may be unnecessary. As an additional example, the statistical analysis of the set of utilization entropy values is, in the illustrated embodiment, a count of the usage status differences at step 312. In some embodiments, more or different statistical analyses may be performed on the set of utilization entropy values or on some subsets of utilization entropy values, as described in more detail above with reference to FIGS. 1-2.

Figure 4:
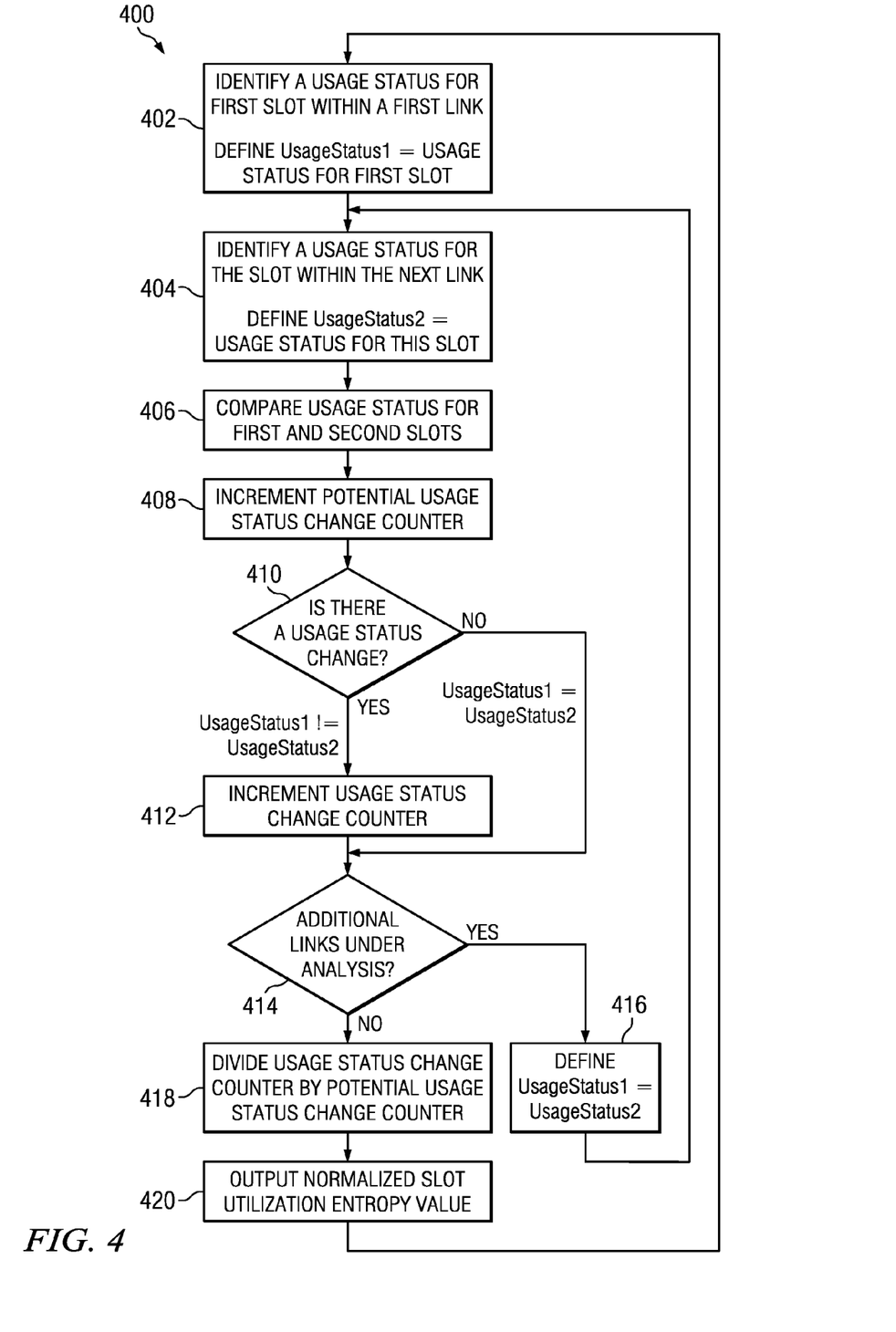
FIG. 4 is a flowchart illustrating one embodiment of a method of monitoring traffic in a network system to determine a normalized slot utilization entropy value, in accordance with certain embodiments of the present disclosure.

FIG. 4 is a flowchart illustrating one embodiment of a method 400 of monitoring traffic in a network system 100 to determine a normalized slot utilization entropy value, in accordance with certain embodiments of the present disclosure. Method 400 may include identifying a usage status for a slot over a plurality of links and calculating a normalized slot utilization entropy value based on the number of usage status differences for one slot 104 from one link 106 to another link 106 within network system 100.

According to one embodiment, method 400 preferably begins at step 402. Teachings of the present disclosure may be implemented in a variety of configurations of nodes 102 and network system 100. As such, the preferred initialization point for method 400 and the order of steps 402-420 comprising method 400 may depend on the implementation chosen.

At step 402, network system 100 may identify a usage status for a slot 104 within a first link 106, as described in more detail above with reference to FIGS. 1-s. In some embodiments, the first link 106 under analysis may be identified as the link with the lowest value link ID, as illustrated in the example data described above with reference to FIG. 2 and TABLES 1-6. In other embodiments, the first link 106 under analysis may be identified as the first link necessary to complete a chosen communication path, or by some other appropriate procedure. In some embodiments, the usage status may be a binary indicator that slot 104 is currently carrying network traffic. For example, a value of "1" may indicate that slot 104 is carrying traffic, while a value of "0" may indicate that slot 104 is unoccupied.

For ease of illustration, portions of pseudo-code that may be used to implement the illustrated embodiment of FIG. 4 are depicted as part of step 402. This code indicates that a variable "UsageStatus1" may be set to be the usage status of the slot 104 under analysis in step 402. This code is provided only to aid in understanding and should be read to limit the scope of the present disclosure. The use of UsageStatus1 and other pseudo code variables is described in further detail below. After identifying the first usage status, method 400 may proceed to step 404.

At step 404, network system 100 may identify a usage status for the slot 104 at the next link 106 under analysis. In some embodiments, the link 106 analyzed at step 402 and the link 106 analyzed at step 404 may be a neighboring pair of links, as described in more detail above with reference to FIGS. 1-2. For ease of illustration, the pseudo code variable "UsageStatus2" is shown as being set to the usage status of the slot 104 under analysis at step 404. After identifying the usage status of slot 104 of the next link 106, method 400 may proceed to step 406.

At step 406, network system 100 may determine the difference between the usage statuses for slot 104 at the first and second links 106 under analysis. That is, network system 100 may compare the values stored in UsageStatus1 and UsageStatus2. In some embodiments, this difference between the usage statuses of the two slots 104 may comprise a utilization entropy value for slot 104 at the set of two links 106. After comparing the values, method 400 may proceed to step 408.

At step 408, method 400 may increment a potential usage status difference counter. Such a counter may be used to keep track of the number of total potential usage status differences for later normalization of entropy values. After incrementing this counter, method 400 may proceed to step 410.

At step 410, method 400 may determine whether there is a usage status difference between slot 104 at the two links 106 under analysis, as described in more detail above with reference to FIGS. 1-2. If there is a difference between the two usage statuses, that is, if UsageStatus1 does not equal UsageStatus2, then method 400 may proceed to step 412.

At step 412, method 400 may calculate a utilization entropy value for slot 104 at the two links 106 under analysis. In some embodiments, this utilization entropy value may be a change in usage status from slot 104 at the first link 106 under analysis to slot 104 at the second link 106 under analysis. Due to the iterative nature of method 400, at step 412 there may have accumulated a set of utilization entropy values. In order to calculate a single slot utilization entropy value, method 400 may perform a statistical analysis on the set of utilization entropy values.

In some embodiments, this statistical analysis may be a summation of the total number of utilization entropy values. In these and other embodiments, it may be sufficient or desirable to increment a usage status difference counter. Such a counter may be used to keep track of the set of utilization entropy values (e.g., the number of actual usage status differences), thereby performing a statistical analysis on the set of utilization entropy values (e.g., summing the total number of actual usage status differences). After incrementing this counter, method 400 may proceed to step 414.

Referring again to step 410, if there was no usage status difference, that is, if UsageStatus1 equals UsageStatus2, then method 400 may proceed to step 414.

At step 414, network system 100 may determine whether there are additional links 106 that require analysis. As described in more detail above with reference to FIGS. 1-2, a slot utilization entropy value may be based on a statistical analysis of a set of utilization entropy values for some or all of the links 106 in network system 100. If additional links 106 are to be analyzed, method 400 may proceed to step 416.

At step 416, network system 100 may reset the pseudo code variable UsageStatus1. These variables are included only for ease of illustration, and are intended to facilitate understanding of the iterative nature of the illustrated embodiment of FIG. 4. In the example code, the value of UsageStatus2 is stored as UsageStatus1. After changing these values, method 400 may return to step 404 to continue analyzing slot 104 at a next link 106.

Referring again to step 414, if no additional links 106 require analysis, method 400 may proceed to step 418. At step 418, the slot utilization entropy value is normalized. In the illustrative example, the slot utilization entropy values (e.g., the value of the usage status counter) is divided by a normalizing factor (e.g., the value of the potential usage status difference counter) to create a value between 0 and 1. After normalizing the slot utilization entropy value, method 400 may proceed to step 420.

At step 420, method 400 may output the normalized slot utilization entropy value to an appropriate portion of network system 100. This output may then be used to determine whether slot 104 along the analyzed links 106 needs to be optimized.

Although FIG. 4 discloses a particular number of steps to be taken with respect to method 400, method 400 may be executed with more or fewer steps than those depicted in FIG. 4. In addition, although FIG. 4 discloses a certain order of steps comprising method 400, the steps comprising method 400 may be completed in any suitable order. For example, method 400 is illustrated with step 408, and the corresponding increment of a potential usage status difference counter. In some configurations, the total number of potential usage status differences may be known in advance, and thus such a step may be unnecessary. As an additional example, the statistical analysis of the set of utilization entropy values is, in the illustrated embodiment, a count of the usage status differences at step 412. In some embodiments, more or different statistical analyses may be performed on the set of utilization entropy values or on some subsets of utilization entropy values, as described in more detail above with reference to FIGS. 1-2.

Figure 5:
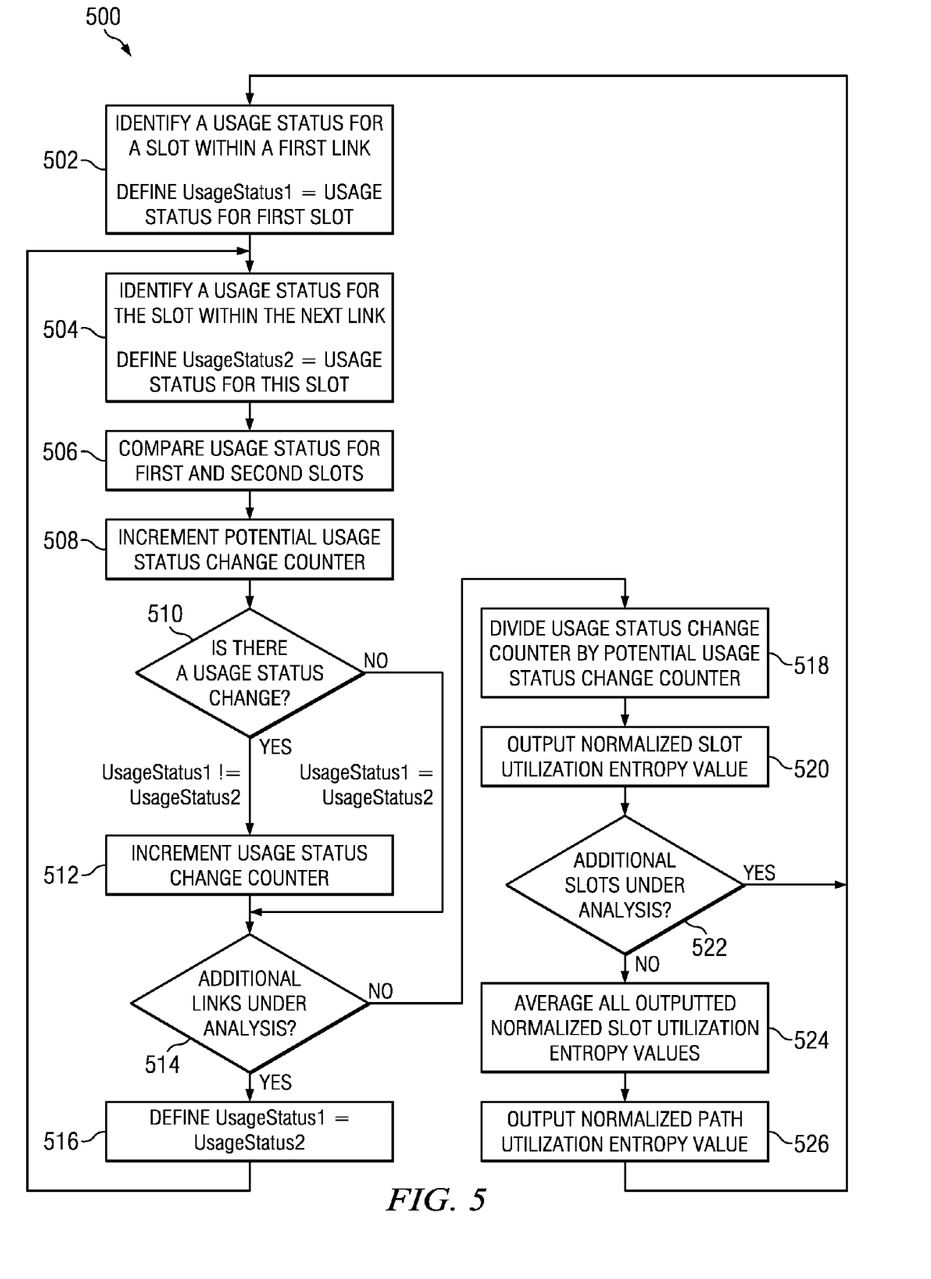
FIG. 5 is a flowchart illustrating one embodiment of a method of monitoring traffic in a network system to determine a normalized path utilization entropy value, in accordance with certain embodiments of the present disclosure.

FIG. 5 is a flowchart illustrating one embodiment of a method 500 of monitoring traffic in a network system 100 to determine a normalized path utilization entropy value, in accordance with certain embodiments of the present disclosure. Method 500 may include identifying a usage status for a plurality of slots over a plurality of links and calculating a normalized path utilization entropy value based on the utilization entropy values for each slot 104 over the plurality of links 106 within network system 100.

According to one embodiment, method 500 preferably begins at step 502. Teachings of the present disclosure may be implemented in a variety of configurations of nodes 102 and network system 100. As such, the preferred initialization point for method 500 and the order of steps 502-526 comprising method 500 may depend on the implementation chosen.

At step 502, network system 100 may identify a usage status for a slot 104 within a first link 106, as described in more detail above with reference to FIGS. 1-2. In some embodiments, the first link 106 under analysis may be identified as the link with the lowest value link ID, as illustrated in the example data described above with reference to FIG. 2 and TABLES 1-6. In other embodiments, the first link 106 under analysis may be identified as the first link necessary to complete a chosen communication path, or by some other appropriate procedure. In some embodiments, the usage status may be a binary indicator that slot 104 is currently carrying network traffic. For example, a value of "1" may indicate that slot 104 is carrying traffic, while a value of "0" may indicate that slot 104 is unoccupied.

For ease of illustration, portions of pseudo-code that may be used to implement the illustrated embodiment of FIG. 5 are depicted as part of step 502. This code indicates that a variable "UsageStatus1" may be set to be the usage status of the slot 104 under analysis in step 502. This code is provided only to aid in understanding and should be read to limit the scope of the present disclosure. The use of UsageStatus1 and other pseudo code variables is described in further detail below. After identifying the first usage status, method 500 may proceed to step 504.

At step 504, network system 100 may identify a usage status for the slot 104 at the next link 106 under analysis. In some embodiments, the link 106 analyzed at step 502 and the link 106 analyzed at step 504 may be a neighboring pair of links, as described in more detail above with reference to FIGS. 1-2. For ease of illustration, the pseudo code variable "UsageStatus2" is shown as being set to the usage status of the slot 104 under analysis at step 504. After identifying the usage status of slot 104 of the next link 106, method 500 may proceed to step 506.

At step 506, network system 100 may determine the difference between the usage statuses for slot 104 at the first and second links 106 under analysis. That is, network system 100 may compare the values stored in UsageStatus1 and UsageStatus2. In some embodiments, this difference between the usage statuses of the two slots 104 may comprise a utilization entropy value for slot 104 at the set of two links 106. After comparing the values, method 500 may proceed to step 508.

At step 508, method 500 may increment a potential usage status difference counter. Such a counter may be used to keep track of the number of total potential usage status differences for later normalization of entropy values. After incrementing this counter, method 500 may proceed to step 510.

At step 510, method 500 may determine whether there is a usage status difference between slot 104 at the two links 106 under analysis, as described in more detail above with reference to FIGS. 1-2. If there is a difference between the two usage statuses, that is, if UsageStatus1 does not equal UsageStatus2, then method 500 may proceed to step 512.

At step 512, method 500 may calculate a utilization entropy value for slot 104 at the two links 106 under analysis. In some embodiments, this utilization entropy value may be a change in usage status from slot 104 at the first link 106 under analysis to slot 104 at the second link 106 under analysis. Due to the iterative nature of method 500, at step 512 there may have accumulated a set of utilization entropy values. In order to calculate a single slot utilization entropy value, method 500 may perform a statistical analysis on the set of utilization entropy values.

In some embodiments, this statistical analysis may be a summation of the total number of utilization entropy values. In these and other embodiments, it may be sufficient or desirable to increment a usage status difference counter. Such a counter may be used to keep track of the set of utilization entropy values (e.g., the number of actual usage status differences), thereby performing a statistical analysis on the set of utilization entropy values (e.g., summing the total number of actual usage status differences). After incrementing this counter, method 500 may proceed to step 514.

Referring again to step 510, if there was no usage status difference, that is, if UsageStatus1 equals UsageStatus2, then method 500 may proceed to step 515.

At step 514, network system 100 may determine whether there are additional links 106 that require analysis. As described in more detail above with reference to FIGS. 1-2, a slot utilization entropy value may be based on a statistical analysis of a set of utilization entropy values for some or all of the links 106 in network system 100. If additional links 106 are to be analyzed, method 500 may proceed to step 516.

At step 516, network system 100 may reset the pseudo code variable UsageStatus1. These variables are included only for ease of illustration, and are intended to facilitate understanding of the iterative nature of the illustrated embodiment of FIG. 5. In the example code, the value of UsageStatus2 is stored as UsageStatus1. After changing these values, method 500 may return to step 504 to continue analyzing slot 104 at a next link 106.

Referring again to step 515, if no additional links 106 require analysis, method 500 may proceed to step 518. At step 518, the slot utilization entropy value is normalized. In the illustrative example, the slot utilization entropy values (e.g., the value of the usage status counter) is divided by a normalizing factor (e.g., the value of the potential usage status difference counter) to create a value between 0 and 1. After normalizing the slot utilization entropy value, method 500 may proceed to step 520.

At step 520, method 500 may output the normalized slot utilization entropy value to an appropriate portion of network system 100. This output may then be accumulated in order to be analyzed along with other normalized slot utilization entropy values. After outputting the normalized slot utilization entropy value, method 500 may proceed to step 522.

At step 522, network system 100 may determine whether additional slots require analysis. As described in more detail above with reference to FIGS. 1-2, a path utilization entropy value may be based on a statistical set of underlying slot utilization entropy values. In some embodiments, a communication path may be considered as a defined number of slots 104 over a defined number of links 106. As described in more detail above with reference to FIG. 2, an illustrative example of a communication path may be a two-slot path between four nodes 102A, 102B, 102C, and 102D. Calculating a path utilization entropy value for such a path may require, in some embodiments, a statistical analysis of the slot utilization entropy values for each of the two slots 104 comprising the two-slot path.

In some configurations, a network utilization entropy value may be calculated as a special case of a path utilization entropy value. For example, if a network is defined as all slots 104 in a link 106 over all links 106 in network system 100, then a network utilization entropy value may be calculated as such path utilization values. As described in more detail above with reference to FIG. 2, additional methods of calculating a network utilization entropy value may be employed without departing from the scope of the present disclosure.

Referring again to step 522, if additional slots 104 require analysis, method 300 may return to step 502, where the process for calculating the slot utilization entropy value for additional slot 104 (e.g., steps 502-520) may be performed before returning to step 522. If not additional slots 104 require analysis, method 500 may proceed to step 524.

At step 524, network system 100 may perform a statistical analysis on the set of normalized slot utilization entropy values to calculate a normalized path utilization entropy value. In some embodiments, the statistical analysis may comprise taking the average of the set of normalized slot utilization entropy values. In other embodiments, more or different statistical analyses may be performed. For example, as described in more detail above with reference to FIG. 2, a path utilization entropy value may take into account a plurality of slot utilization entropy values, wherein the plurality of slot utilization entropy values were defined over paths of differing lengths. In such an embodiment, it may be necessary or desirable to take into account the differing lengths in determining the network utilization entropy value. After performing the statistical analysis, method 500 may proceed to step 526.

At step 526, method 500 may output the normalized path utilization entropy value to an appropriate portion of network system 100. This output may then be used to determine whether the path analyzed needs to be optimized. After outputting the normalized path utilization entropy value, method 500 may return to step 502, where method 500 may begin again.

Although FIG. 5 discloses a particular number of steps to be taken with respect to method 500, method 500 may be executed with more or fewer steps than those depicted in FIG. 5. In addition, although FIG. 5 discloses a certain order of steps comprising method 500, the steps comprising method 500 may be completed in any suitable order. For example, method 500 is illustrated with step 508, and the corresponding increment of a potential usage status difference counter. In some configurations, the total number of potential usage status differences may be known in advance, and thus such a step may be unnecessary. As an additional example, the statistical analysis of the set of utilization entropy values is, in the illustrated embodiment, a count of the usage status differences at step 512. In some embodiments, more or different statistical analyses may be performed on the set of utilization entropy values or on some subsets of utilization entropy values, as described in more detail above with reference to FIGS. 1-2.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for monitoring traffic in a network comprising a plurality of links, wherein each of the plurality of links comprises a plurality of neighboring pairs of slots, the method comprising:

receiving network traffic at a traffic monitoring module of a network node;

using the traffic monitoring module, identifying a usage status for a first slot and a second slot, the first and second slots being a neighboring pair of slots, the neighboring pair of slots being one of the plurality of neighboring pairs of slots;

calculating a utilization entropy value for the first and second slots, the utilization entropy value based at least on a difference between the usage status for the first slot and the usage status for the second slot;

performing the above steps for each of the neighboring pairs of the plurality of neighboring pairs of slots to create a set of utilization entropy values; and calculating a link utilization entropy value, the link utilization entropy value based at least on a statistical analysis of the set of utilization entropy values.

2. The method of claim 1, wherein each slot of the plurality of neighboring pairs of slots is associated with a different optical wavelength.

3. The method of claim 1, further comprising normalizing the link utilization entropy value.

4. The method of claim 3, wherein normalizing the link utilization entropy value comprises dividing the link utilization entropy value by the total possible number of differences between the usage status for the first slot and the usage for the second slot for each of the neighboring pairs of the plurality of neighboring pairs of slots.

5. The method of claim 1, further comprising communicating the link utilization entropy value to a network optimization engine, the network optimization engine configured to decide whether to optimize a portion of the network based at least on the link utilization entropy value.

6. A method for monitoring traffic in a network comprising a plurality of neighboring pairs of links, wherein each of the links of the plurality of neighboring pairs of links comprises a plurality of slots, the method comprising:

receiving network traffic at a traffic monitoring module of a network node;

using the traffic monitoring module, identifying a first usage status for a slot in a first link;

using the traffic monitoring module, identifying a second usage status for the slot in a second link, the first and second links forming a neighboring pair of links, the neighboring pair of links being one of the plurality of neighboring pairs of links;

calculating a utilization entropy value for the slot in the first and second links, the utilization entropy value based at least on a difference between the first usage status and the second usage status;

performing the above steps for each of the neighboring pairs of the plurality of neighboring pairs of links to create a set of utilization entropy values; and calculating a slot utilization entropy value, the slot entropy value based at least on a statistical analysis of the set of utilization entropy values.

7. The method of claim 6, wherein each slot of the plurality of slots is associated with a different optical wavelength.

8. The method of claim 6, further comprising normalizing the slot utilization entropy value.

9. The method of claim 8, wherein normalizing the slot utilization entropy value comprises dividing the slot utilization entropy value by the total possible number of differences between the first usage status and the second usage for each of the neighboring pairs of the plurality of neighboring pairs of links.

10. The method of claim 6, further comprising:
performing the above steps for each of the slots within the plurality of slots to create a set of slot utilization entropy values; and
calculating a network utilization entropy value, the network entropy value based at least on a statistical analysis of the set of slot utilization entropy values.

11. The method of claim 10, further comprising normalizing the network utilization entropy value.

12. The method of claim 11, wherein normalizing the network utilization entropy value comprises dividing the network utilization entropy value by the total number of slots within the plurality of slots.

13. The method of claim 10, further comprising communicating the network utilization entropy value to a network optimization engine, the network optimization engine configured to decide whether to optimize utilization of a portion of the network based at least on the network utilization entropy value.

14. The method of claim 6, further comprising:
performing the above steps for a subset of neighboring pairs of links to create a set of utilization entropy values, wherein:
the subset of neighboring pairs of links are part of the plurality of neighboring pairs of links; and
the subset of neighboring pairs of links form a path; and
calculating a first path utilization entropy value, the first path entropy value based at least on a statistical analysis of the set of utilization entropy values.

15. The method of claim 14, further comprising normalizing the first path utilization entropy value.

16. The method of claim 15, wherein normalizing the first path utilization entropy value comprises dividing the first path utilization entropy value by the total possible number of differences between the first usage status and the second usage status for each of the neighboring pairs of links comprising the subset of neighboring pairs of links.

17. The method of claim 14, further comprising:
performing the above steps for each of the slots within the plurality of slots to create a set of first path utilization entropy values; and
calculating a second path utilization entropy value, the second path entropy value based at least on a statistical analysis of the set of first path utilization entropy values.

18. The method of claim 17, further comprising normalizing the second path utilization entropy value.

19. The method of claim 18, wherein normalizing the second path utilization entropy value comprises dividing the second path utilization entropy value by the total number of slots in the plurality of slots.

20. The method of claim 17, further comprising communicating the second path utilization entropy value to a network optimization engine, the network optimization engine configured to decide whether to optimize utilization of a portion of the network based at least on the second path utilization entropy value.

21. The method of claim 14, further comprising communicating the first path utilization entropy value to a network optimization engine, the network optimization engine configured to decide whether to optimize utilization of a portion of the network based at least on the first path utilization entropy value.

22. An optical node comprising:
a traffic monitoring module for monitoring traffic in an optical network comprising a plurality of links, wherein each of the plurality of links comprises a plurality of neighboring pairs of slots, the traffic monitoring module configured to:

identify a usage status for a first slot and a second slot, the first and second slots being a neighboring pair of slots, the neighboring pair of slots being one of the plurality of neighboring pairs of slots;

calculate a utilization entropy value for the first and second slots, the utilization entropy value based at least on a difference between the usage status for the first slot and the usage status for the second slot;

perform the above steps for each of the neighboring pairs of the plurality of neighboring pairs of slots to create a set of utilization entropy values; and calculate a link utilization entropy value, the link utilization entropy value based at least on a statistical analysis of the set of utilization entropy values.

23. The optical node of claim 22, wherein each slot of the plurality of slots is associated with a different optical wavelength.

24. The optical node of claim 22, wherein the traffic monitoring module is further configured to normalize the link utilization entropy value.

25. The optical node of claim 24, wherein the traffic monitoring module is configured to normalize the link utilization entropy value by dividing the link utilization entropy value by the total possible number of differences between the usage status for the first slot and the usage for the second slot for each of the neighboring pairs of the plurality of neighboring pairs of slots.

26. The optical node of claim 22, wherein the traffic monitoring module is further configured to communicate the link utilization entropy value to a network optimization engine, the network optimization engine configured to decide whether to optimize a portion of the network based at least on the link utilization entropy value.

27. A system for monitoring traffic in an optical network comprising a plurality of neighboring pairs of links, wherein each of the links of the plurality of neighboring pairs of links comprises a plurality of slots, the system comprising:

a first traffic monitoring module configured to identify a first usage status for a slot in a first link;

a second traffic monitoring module configured to identify a second usage status for the slot in a second link, the first and second links forming a neighboring pair of links, the neighboring pair of links being one of the plurality of neighboring pairs of links; and a network management system configured to calculate a utilization entropy value for the slot in the first and second links, the utilization entropy value based at least on a difference between the first usage status and the second usage status; and wherein the first and second traffic monitoring modules and the network management system are configured to perform the above steps for each of the neighboring pairs of the plurality of neighboring pairs of links to create a set of utilization entropy values; and wherein the network management system is configured to calculate a slot utilization entropy value, the slot entropy value based at least on a statistical analysis of the set of utilization entropy values.

28. The system of claim 27, wherein each slot of the plurality of slots is associated with a different optical wavelength.

29. The system of claim 28, wherein the network management system is configured to normalize the network utilization entropy value by dividing the network utilization entropy value by the total possible number of differences between the first usage status and the second usage for each of the slots of the network.

30. The system of claim 27, wherein the traffic monitoring module is further configured to normalize the slot utilization entropy value.

31. The system of claim 27, wherein the network management system is configured to normalize the slot utilization entropy value by dividing the slot utilization entropy value by the total possible number of differences between the first usage status and the second usage for each of the neighboring pairs of the plurality of neighboring pairs of links.

32. The system of claim 27, wherein:

the first and second traffic monitoring modules are further configured to perform the above steps for each of the slots within the plurality of slots to create a set of slot utilization entropy values; and the network management system is further configured to calculate a network utilization entropy value, the network entropy value based at least on a statistical analysis of the set of slot utilization entropy values.

33. The system of claim 27, wherein the network management system is further configured to normalize the network utilization entropy value.

34. The system of claim 27, wherein the network management system is further configured to communicate the network utilization entropy value to a network optimization engine, the network optimization engine configured to decide whether to optimize utilization of a portion of the network based at least on the network utilization entropy value.

35. The system of claim 27, wherein:

the first and second traffic monitoring modules and the network management system are further configured to perform the above steps for a subset of neighboring pairs of links to create a set of utilization entropy values, wherein:

the subset of neighboring pairs of links are part of the plurality of neighboring pairs of links; and the subset of neighboring pairs of links form a path; and the network management system is further configured to calculate a first path utilization entropy value, the first path entropy value based at least on a statistical analysis of the set of slot utilization entropy values.

36. The system of claim 35, wherein the network management system is further configured to normalize the first path utilization entropy value.

37. The system of claim 36, wherein the network management system is configured to normalize the first path utilization entropy value by dividing the first path utilization entropy value by the total possible number of differences between the first usage status and the second usage for each of the neighboring pairs of links comprising the subset of neighboring pairs of links.

38. The system of claim 35, wherein the first and second traffic monitoring modules and the network management system are further configured to perform the above steps for each of the slots within the plurality of slots to create a set of first path utilization entropy values; and the network management system is further configured to calculate a second path utilization entropy value, the second path entropy value based at least on a statistical analysis of the set of first path utilization entropy values.

39. The system of claim 38, wherein the network management system is further configured to normalize the second path utilization entropy value.

40. The system of claim 39, wherein the network management system is configured to normalize the second path utilization entropy value by dividing the second path utilization entropy value by the total number of slots in the plurality of slots.

41. The system of claim 38, wherein the network management system is further configured to communicate the second path utilization entropy value to a network optimization engine, the network optimization engine configured to decide whether to optimize utilization of a portion of the network based at least on the second path utilization entropy value.

42. The system of claim 35, wherein the network management system is further configured to communicate the first path utilization entropy value to a network optimization engine, the network optimization engine configured to decide whether to optimize utilization of a portion of the network based at least on the first path utilization entropy value.

* * * * *